United States Patent [19]
O'Brien et al.

[11] 3,883,853
[45] May 13, 1975

[54] ADDRESS GENERATOR FOR ROTATING DATA STORAGE DEVICES

[75] Inventors: Harry C. O'Brien, Thousand Oaks; James V. Rubino, Newberry Park; Herbert J. Smith, Thousand Oaks, all of Calif.

[73] Assignee: Burroughs Corporation, Detroit, Mich.

[22] Filed: Aug. 2, 1973

[21] Appl. No.: 385,145

[52] U.S. Cl. .............................................. 340/172.5
[51] Int. Cl. ......................... G06f 13/04; G11b 27/20
[58] Field of Search .................. 340/172.5, 174.1 A; 178/6.6

[56] References Cited

UNITED STATES PATENTS

| | | | |
|---|---|---|---|
| 3,500,330 | 3/1970 | Hertz | 340/172.5 |
| 3,531,787 | 9/1970 | Fuller | 340/174.1 A |
| 3,577,132 | 5/1971 | Anderson et al. | 340/174.1 A |
| 3,686,639 | 8/1972 | Fletcher | 340/172.5 |
| 3,696,353 | 10/1972 | Quiqgue | 340/174.1 A |
| 3,699,565 | 10/1972 | Nagai | 340/174.1 L X |
| 3,701,846 | 10/1972 | Zenzefilis | 178/6.6 DD |
| 3,755,790 | 8/1973 | Berger | 340/172.5 |

*Primary Examiner*—Raulfe B. Zache
*Assistant Examiner*—Jan E. Rhoads
*Attorney, Agent, or Firm*—Gilbert H. Friedman; Nathan Cass; Kevin R. Peterson

[57] ABSTRACT

An address generator for synchronizing access to a rotating memory store is disclosed. Digital counting circuits are used for accumulating current segment addresses therein obviating the need for address tracks on the memory store. The pulses of a read/write clock signal are counted in a bit counter. The bit counter produces an output pulse each time the count reaches the modulo of the counter. This modulo is selected to equal the number of bits storable in a segment. The bit counter output is accumulated in a segment counter. Variable modulo bit counters are used to adapt the address generator for use with different input/output controllers and data processors characterized either by operation with different fixed sizes of addressable units of information or by a capability for dynamically varying the size of such addressable units of information. This adaptation is accomplished by having either a static or dynamically varied segment length selecting signal supplied to the address generator. In multi-zone systems, a plurality of read/write clock signals are generated to control data transfer at the several predetermined frequencies associated with the several zones. The read/write clock signals are derived from a single source of timing data associated with the memory store. Circuits for frequency multiplication and division are coupled to provide read/write clock signals at each of the frequencies associated with the several zones. In some embodiments, bit and segment counters are provided for each of the read/write clock signals. In other embodiments, the appropriate read/write clock signal for the selected zone is generated and counted.

36 Claims, 7 Drawing Figures

ADDRESS GENERATOR FOR ROTATING DATA STORAGE DEVICES

BACKGROUND OF THE INVENTION

1. Field of the Invention

This invention finds application in the field of information storage and retrieval equipment and, more particularly, in the timing and addressing of rotating information storage media.

2. Description of the Prior Art

Information storage equipment using rotating memory stores is used extensively in contemporary data processing systems for storing relatively large quantities of information. Their use usually is the result of a compromise between desires for high speed accessibility and low cost per unit of information stored. More costly higher speed memory devices having relatively less storage capacity are usually closely coupled to the primary data manipulating portions of a system. Equipments using rotating memory stores are usually less closely coupled to these portions. As required, information is transferred back and forth between the high-speed limited-capacity memory devices and the lower-speed larger-capacity bulk storage equipments through an interface which may include an input-output (I/O) controller directed by system software.

Magnetic disk systems may consist of a single disk in a storage unit with the capacity for recording on one or both of the two disk faces. Larger systems exist in which a single storage unit may have a plurality of disks mounted for rotation on the same shaft or a plurality of storage units of the single or multiple disk variety. The storage of information on circular information tracks on a surface of a disk is accomplished by the use of one or more read/write heads which are caused to move across a disk face or by the use of fixed heads on a head-per-track basis. Although parallel recording is possible in systems employing more than one head per disk face, all of the bits of any one unit of information are more commonly recorded serially in a single information track. The mounting of the fixed read/write heads or the positioning apparatus for movable heads defines the location of the plurality of concentric circular information tracks on the surface of a disk. In order to achieve maximum efficiency in utilization of available storage space, tracks will be spaced as close together as practical and the information recorded therein will be at the highest bit packing density consistent with the state of the art of recording. Individual data bits along a track may be recorded at a density of thousands or even tens of thousands of bits per inch of track. Track spacing may be on the order of hundreds of tracks per inch.

Modern data processors are capable of conveniently manipulating units of information having varying sizes. Such a unit may be a single bit, a character containing a predetermined number of bits, a word containing a predetermined number of characters or a record containing a predetermined number of words. However, I/O controls are commonly mechanized to associate only one selected size of information unit with a given address in a storage unit. Where this is the case, all operations to store data in or retrieve data from a designated location are designed to transfer the same number of bits. To conform to this mode of operation, in the prior art, the data on an information track of a disk is organized into segments of equal length in terms of the number of bits which may be contained therein. Such a segment may contain a complete record or a predetermined fraction thereof. Where all of the information on a disk surface is recorded at the same frequency, the information on the disk is further organized so that every track has one segment at each of a plurality of predetermined angular positions with respect to an imaginary line of reference on the disk. All of the segments on each track which are at the same angular position are contained within a single pair of imaginary radial lines on the disk face. This group of segments comprises a sector, all of the segments of which are collectively designated by a single segment address.

The circuits which control access to an individual segment must be synchronized to the rotation of the disk, including any variations in the speed of rotation, by means directly associated with the disk. To accomplish this, the prior art uses three auxiliary tracks, each cooperating with a fixed head, on at least one disk surface in a storage unit. First, a disk clock track is provided which, when read, produces a memory store clock signal, or disk clock signal, for timing the reading and writing of individual bits. This prior art disk clock track has a clock pulse prerecorded thereon for each bit storage location (bit cell) on an information track. Second, a disk mark pulse (DMP) track having a single clock pulse prerecorded thereon is also provided. The DMP is read once per revolution and the signal generated serves as the reference for address counting in that it establishes the imaginary line of reference on the disk surface from which the angular position of segments is measured as discussed above. Finally, an address track is commonly provided which contains a prerecorded address for each sector. The prerecorded address itself is commonly a number which is a measure of the angular position of the corresponding sector.

To improve on this system, the prior art has combined the functions of the disk clock track and the disk mark pulse track and thereby eliminated the need for providing the latter. A method and apparatus for generating both the memory store clock signal, and the DMP signal from a single disk clock track are described in Quiogue, U.S. Pat. No. 3,696,353 issued Oct. 3, 1972 and assigned to the same assignee as the present invention. In the invention of the referenced patent, one clock pulse is omitted from the clock track. The DMP is generated when the discontinuity in the memory store clock signal is detected. One additional track is thereby made available for information storage.

In order to produce high bit packing densities in the information tracks, it follows that a disk clock track which defines the individual bit cells directly also has the clock pulses prerecorded therein at a high density. However, certain problems are associated with high density recording. For example, the amplitude of the signal output by a read head will be reduced as the density increases. For data, relatively low signal levels may be tolerable and subjected to compensation. However, reliability considerations will generally require a relatively higher minimum amplitude level for clock signals.

In Anderson et al., U.S. Pat. No. 3,577,132, issued May 4, 1971, there is disclosed an apparatus for data storage systems which replaces the prerecorded disk clock track with a toothed wheel mounted on the same spindle with a disk pack. The memory store clock sigal thus produced is at a relatively low frequency which unsuitable for controlling data transfer directly. A ıitable read/write clock signal for controlling data 'ansfer is produced therefrom by a frequency multilying circuit. The use of the additional structure inolving the toothed wheel is rather cumbersome and dds additional fabrication costs to a data storage sys:m.

To access a particular segment on a disk for reading r writing, the prior art provides means for "addressıg" the memory store. The input/output controller is aused to load a composite address for the desired segıent into an address register. The address register has everal fields, each one of which controls somewhat ifferent functions through appropriate decoding ciruits connected thereto. The field in the most signifiant position will enable the circuits servicing the desgnated disk face. The field in the subsequent most sigificant position will select the designated information rack by enabling the appropriate fixed read/write head r by causing an appropriate movable head to be ıoved adjacent that track. The least significant field ontains the designated segment address. The contents f this last field are continuously compared in a comarator circuit with the segment address most recently ead from the address track. When a COMPARE signal esults, a read/write clock signal is permitted to synhronize the operation of the appropriate read/write ıead to effect the data transfer.

In the prior art data storage system described thus ar, a disk clock track may be provided to produce a ingle memory store clock signal which is a read/write :lock signal at an appropriate frequency for controlling eading and writing in all of the information tracks. For lisk memory stores, such a single frequency system can ›rovide maximum bit packing density on the innermost nformation track only. The information tracks having arger radii will be less efficiently utilized since they will :ontain fewer bit cells per unit length of track. A nethod for increasing the utilization of the available storage space has been adopted in some contemporary lisk equipments. The recording area has been divided nto a plurality of concentric annular frequency zones, each zone comprising a plurality of information tracks. A separate zone clock track is prerecorded on the disk ıt a different frequency for each zone. Each such zone :lock track produces the maximum packing density only in the innermost track of the zone. On such a mul:i-zone disk, all of the sectors within any one zone will ıave the same angular extent. However, the angular ex:ent of sectors in adjacent zones decreases as the zones ıre farther removed from the center of rotation and ıigher frequencies of recording are used. Therefore, in ıddition to the several zone clock tracks, the prior art ıses a separate prerecorded address track on the disk for each zone.

The use of recording space for a plurality of zone :lock and address tracks remains a source of ineffi:iency in multi-zone (multi-frequency) systems. For example, given a disk surface having four zones of 50 tracks each, a minimum of four zone clock tracks and four address tracks are required. In this example, approximately 4 percent more information could be stored on that surface if all of the address tracks and all but one of the clock tracks were made available for data storage.

In multi-zone data storage systems, one field of the composite address is designated the zone selection field. In movable head systems, for example, the travel required to position a read/write head over a designated information track is reduced where at least one head is provided for each zone. In such a system, the zone selecting signal produced by the circuits cooperating with the corresponding portion of the address register enable the use of the appropriate read/write head. In this example, the zone selecting signal is the same as, and equivalent to, the head selecting signal. In systems using one fixed head for each track, the zone selected field comprises the most significant portion of the head selection field.

Ordinarily, a specific storage unit is suitable for use with more than one type of data processing system. However, one of the differences often found between such systems is in the size of the information unit they are mechanized to transfer across the interface with the storage unit. One system's I/O controller may, for example, operate only with 180 word records while another may operate only with 120 word records. The system of intended use will determine the format for the address tracks prerecorded by the manufacturer. Given a storage unit formatted to be used for the storage of 180 word records, use of that storage unit with a data processing system having only 120 words per addressable record wastes approximately one-third of the storage space. It is preferable to revise the address tracks. However, such a re-recording of the address tracks is costly and time-consuming.

SUMMARY OF THE INVENTION

An object of this invention is to increase the information storage capability of rotating storage media.

Another object of this invention is to provide means for generating clock signals and segment addresses synchronized with the rotation of a memory store from a mininum number of timing signal sources directly associated with the store.

A still further object of this invention is to provide a method and circuit means for use with a memory store whereby the size of an addressable information unit may be readily and inexpensively altered.

Yet another object of this invention is to provide circuit means for generating a plurality of read/write clock signals for synchronizing data transfer to and from a multi-zone rotating memory store such as a disk from a source of timing data prerecorded on the store at a frequency which is independent of the frequencies of the read/write clock signals.

A still further object of this invention is to eliminate the need to prerecord address tracks on a memory store.

In accordance with this invention, an address generator is provided wherein a number representative of the angular position of a currently addressable location on a rotating memory store is established in a segment counter. The pulses counted by the segment counter are generated by a bit counter having a modulo equal to the number of bits in an addressable location. The bit counter counts the pulses of the read/write clock signal used to synchronize the transfer of individual bits of information to and from the store. The read/write clock signal is derived from a memory store clock signal obtained from a timing signal source, such as a disk clock track, associated directly with the rotating memory store. In a preferred embodiment, a reference clock signal having a frequency greater than that of both the memory store clock signal and the read/write clock signal is generated by a frequency multiplier circuit operating on the memory store clock signal. A frequency dividing circuit receives the reference clock signal and generates the read/write clock signal at the desired frequency for synchronizing transfer.

Where this inventin is used for multi-zone data storage, a plurality of frequency dividers, each having a different fixed division factor, is sued in some embodiments to produce a plurality of read/write clock signals at the several desired frequencies. In other embodiments, a single variable division factor frequency divider is caused to generate a read/write clock signal at the desired frequency as determined by a coded zone selecting signal.

Where the number of bits to be stored in all of the individually addressable segments on the memory store is held constant, fixed modulo bit counters are used. However, where the number of bits in a segment may be varied, variable modulo bit counters are used. In the latter case, a coded segment length selecting signal is applied to set the modulo of a bit counter. In some applications, the segment length selecting signal is held static to adapt the address generator for use with the fixed information unit size data transfer charactristics of the particular input-output controller or data processor to which the memory store is coupled. In other embodiments, the segment length selecting signal may be varied dynamically by input/output controls having a capability for storing different sizes of individually addressable information units on the memory store.

The foregoing and other features of the present invention will be more readily apparent from the following detailed description and drawings.

DESCRIPTION OF THE PREFERRED EMBODIMENTS

Figure 1:
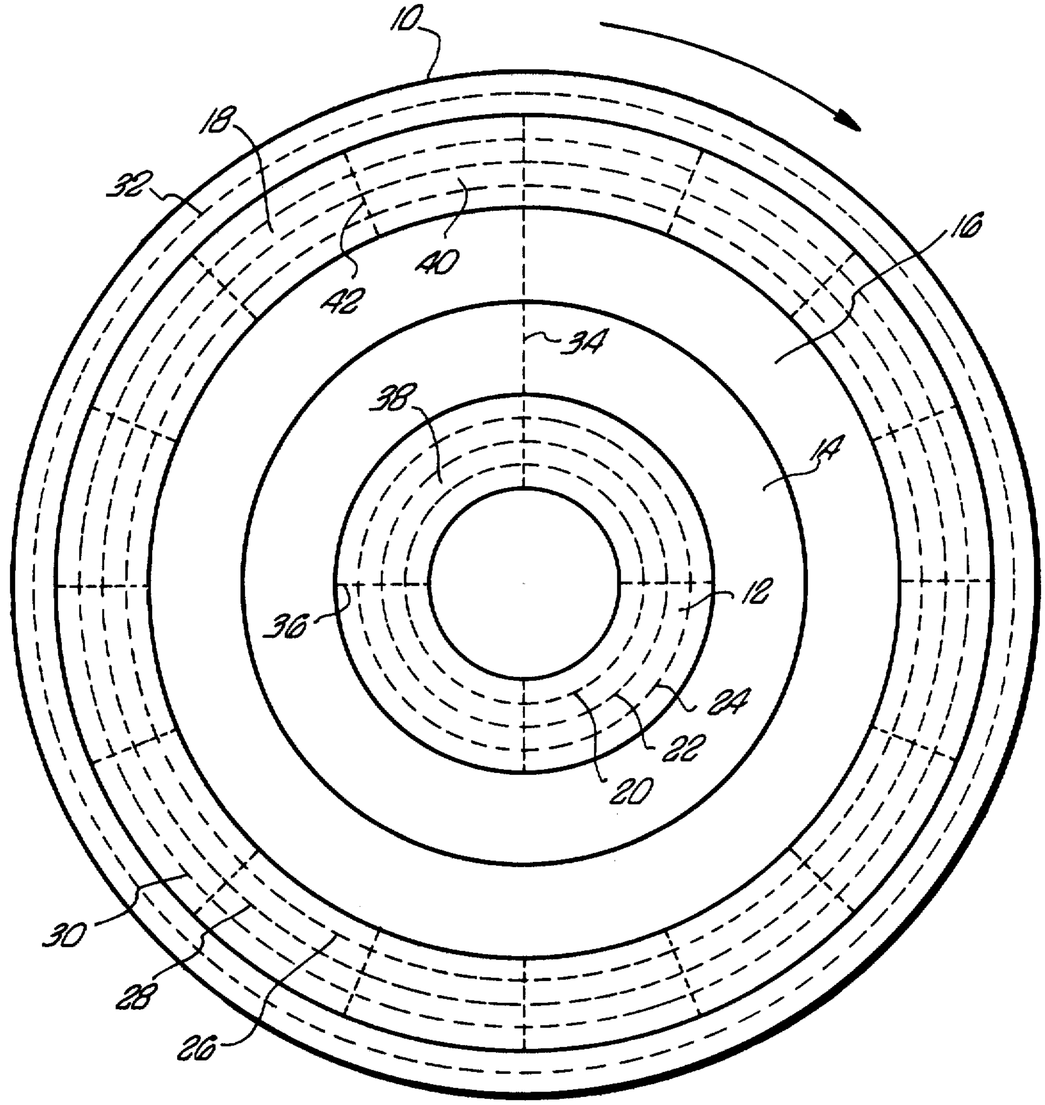
FIG. 1 is a sketch illustrating the organization of tracks and data on a disk.

In FIG. 1, a continuously rotating magnetizable disk 10 of a disk file data storage system has a magnetic surface on which data is recorded in concentric circular tracks by read/write heads (not shown). The tracks are grouped in a plurality of annular information storage zones, e.g., zones 12, 14, 16 and 18, which are represented as bounded by imaginary concentric solid circular lines. As depicted in FIG. 1, each zone has the same radial width and therefore contains the same number of information tracks. The tracks are symbolized by concentric dashed circular lines 20, 22 and 24 in zone 12 and similar lines 26, 28 and 30 in zone 18. Althoug information zones having equal numbers of tracks for data storage, as shown in FIG. 1, are sometimes preferred, e.g., in systems using one movable head per zone, it should be noted that such equality is not essential in every data storage system. The fundamental difference between a given zone and other zones is the frequency at which data is recorded therein. As the disk is traversed outward from the center, the tracks of each succeeding zone are characterized by the use of a successively higher predetermined zone frequency for recording to effect maximum bit packing density in the innermost track of that zone.

A disk clock track and a disk mark pulse track, represented jointly in FIG. 1 by a single imaginary dashed circular line 32, are disposed around the outer periphery of the disk 10.

The organization of the data in the information tracks into segments and sectors is shown in FIG. 1 by, for example, one pair of dashed radial lines 34 and 36 which bound all of the segments in a sector 38 of zone 12. Another group of segments having the same length is located in a sector 40 of the outermost zone 18 beteen dashed radial lines 34 and 42. In this example, all segments in sector 40 have the same number of bit cells as the segments in sector 38. However, sector 40 has only one-fourth the angular extent of sector 38 since the innermost track of zone 18 is located at four times the radial distance from the center as the innermost track of zone 12 in this example. The result is that zone 18 can accommodate four times as many sectors as zone 12.

Figure 2:
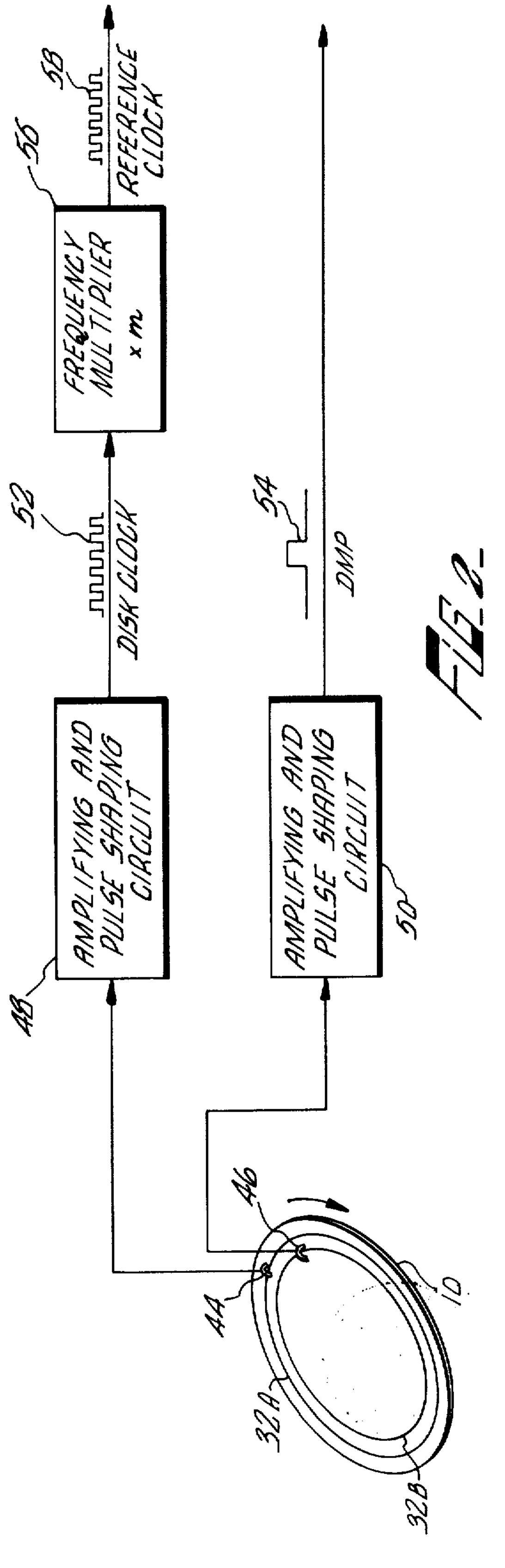
FIG. 2 is part sketch and part block diagram of apparatus for generating certain clock signals.

Radial line 34 is shown as traversing all of the information zones 12, 14, 16 and 18 to represent the imaginary line of reference for angular measurement established by a disk mark pulse 54 (see FIG. 2).

As shown in FIG. 2, a disk clock signal 52 is generated by a magnetic transducer 44 cooperating with a prerecorded disk clock track 32A on a rotating disk memory store 10. The density of pulses on the disk clock track 32A is preselected to be within the range of bit densities which is desirable for producing timing signals at an amplitude acceptable for clocking. The specific bit density, within that range, is chosen to be that which produces a signal frequency which is convenient for subsequent frequency multiplication and frequency division by other elements of this invention as explained below. As also represented in FIG. 2, a disk mark pulse 54 is generated by a magnetic transducer 46 cooperating with a prerecorded track 32B on the disk 10. This provides an indexing signal once per revolution of the disk. Both the memory store clock signal, here the disk clock signal 52, and the disk mark pulse 54 are subjected to appropriate amplification and pulse shaping in circuits 48 and 50, respectively, before further processing or utilization. The disk clock signal 52 is input to a frequency multiplying circuit 56. The output of the frequency multiplier 56 is a reference clock signal 58 having a frequency greater than that of the disk clock signal 52 by a preselected multiplication factor m. The frequency of the reference clock signal 58 incurs changes proportional to changes in the speed of rotation of the disk 10 in the same manner as the disk clock signal 52.

Figure 3:
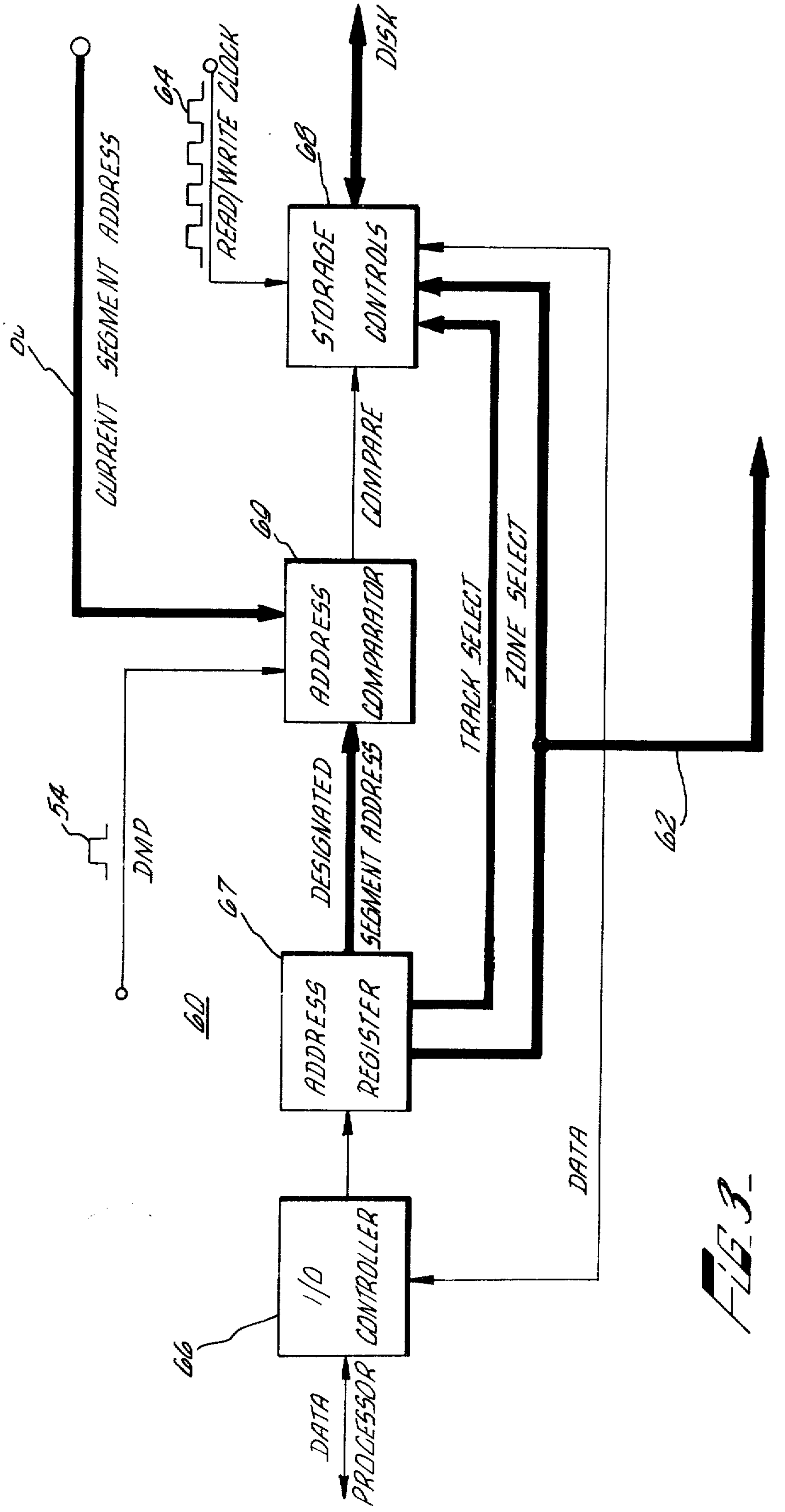
FIG. 3 is a block diagram of an interface system for controlling the transfer of data between a data processor and a disk file data storage unit.

FIG. 3 is a generalized block diagram showing the major functional components of an interface system 60 for coupling a data processor (not shown) to the read/-write circuits (not shown) of a disk file. The functions represented are, for the most part, well known in the prior art and have been discussed above. Interface 60 may be used in cooperation with address generators such as the embodiment shown in FIG. 5 with only minor modifications from the prior art. These comprise means in the Address Comparator 69 for recognizing the occurrence of a DMP 54, means for providing a zone selecting signal on bus 62 to an address generator and means for coupling a read/write clock signal 64 from an address generator to the Storage Controls 68. These modifications will be further discussed below.

Figure 7:
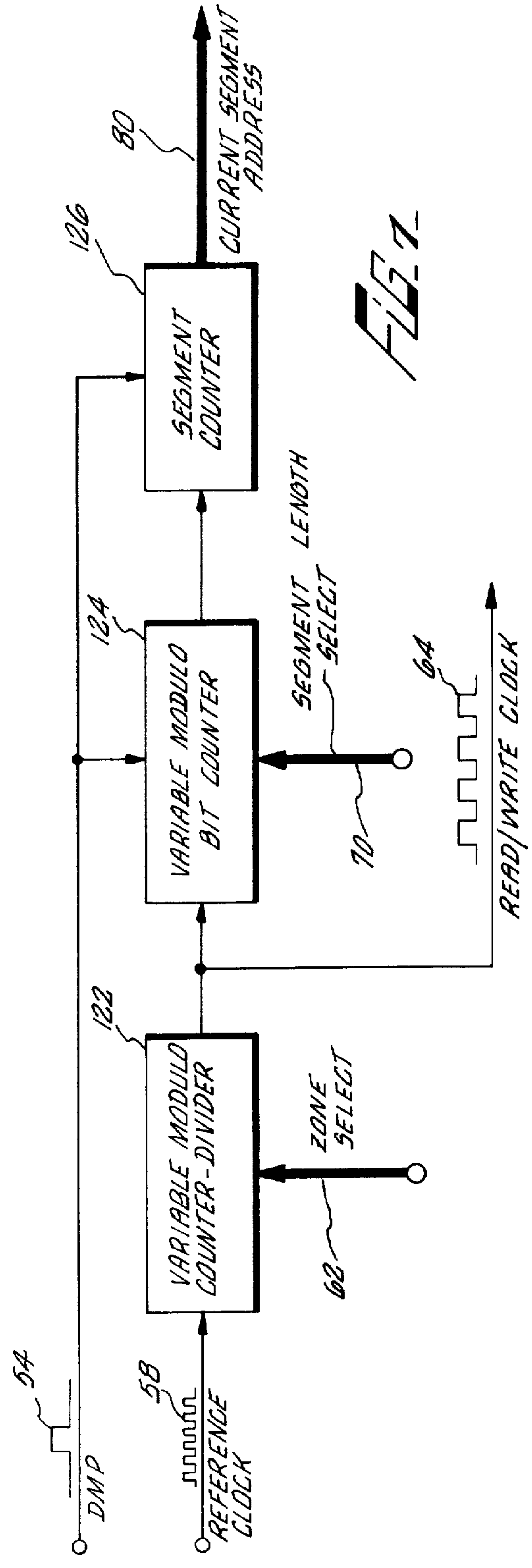
FIG. 7 is a schematic block diagram of yet another address generator embodiment which employs a single frequency divider circuit to produce a single read/write clock signal at a frequency which may be varied.
Figure 4:
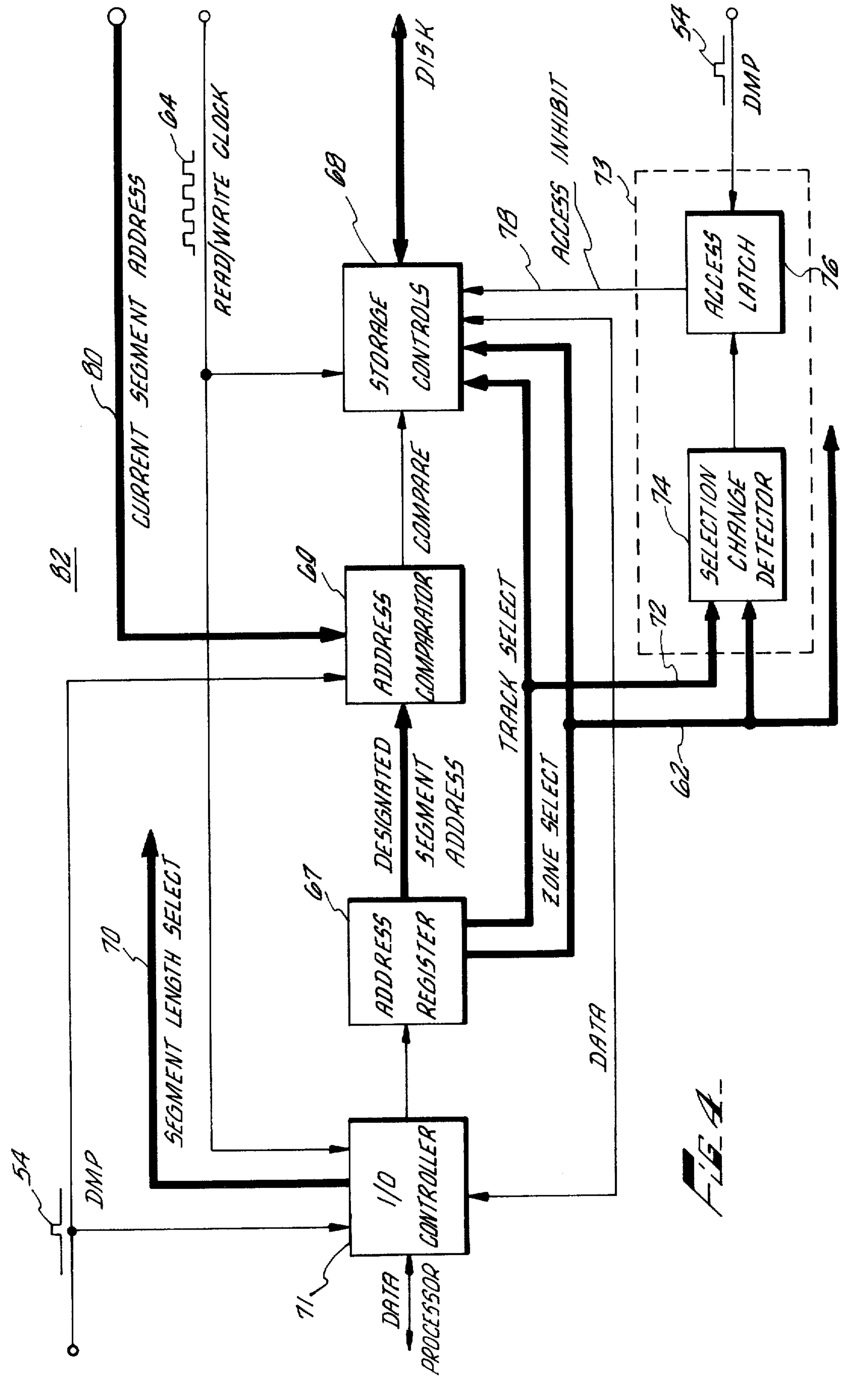
FIG. 4 is a block diagram showing an interface system similar to that shown in FIG. 3 but augmented with functional elements required to implement certain embodiments of this invention.
Figure 6:
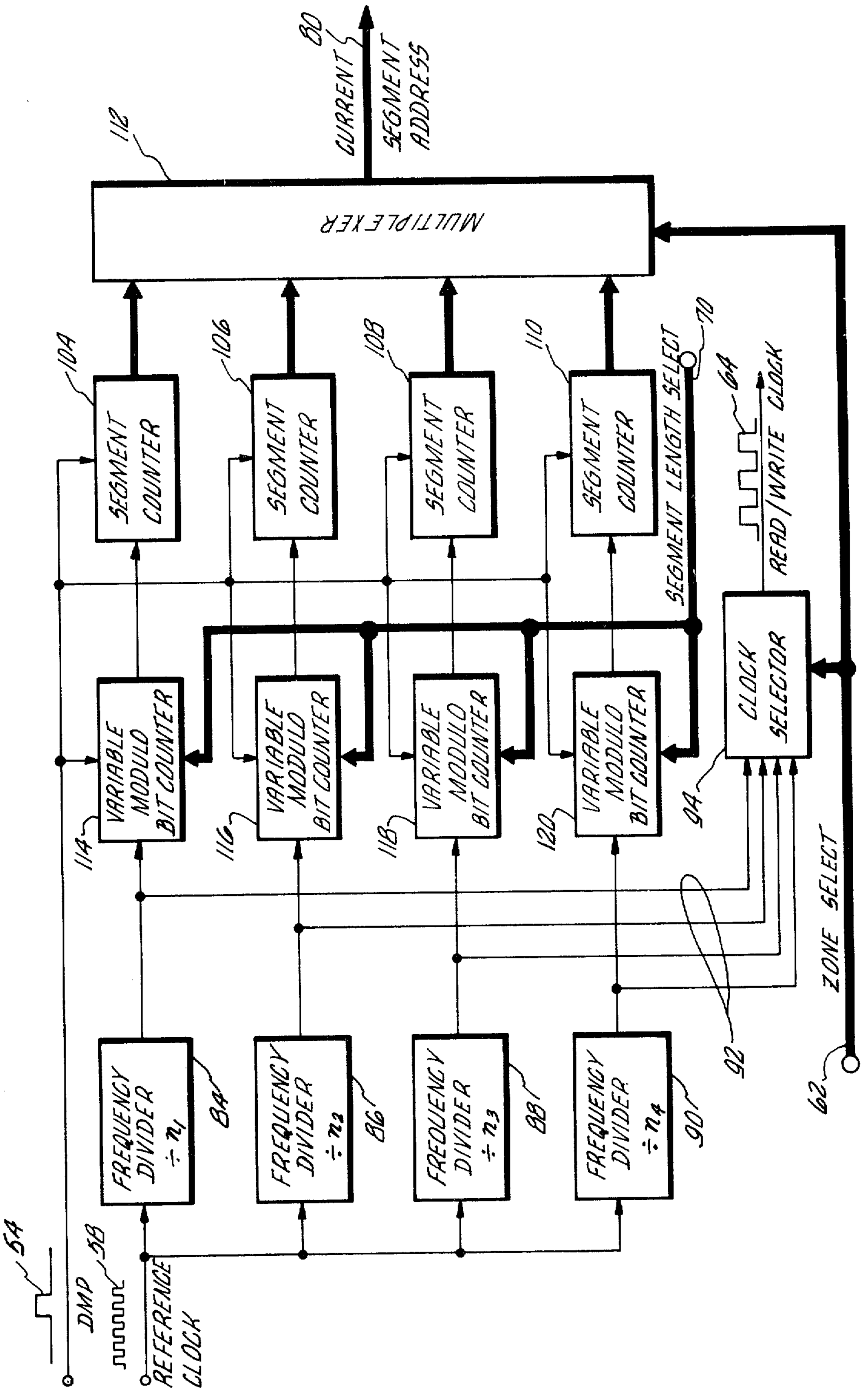
FIG. 6 is a schematic block diagram of another embodiment of an address generator capable of accommodating variations in segment length.

FIG. 4 is a block diagram of an interface system 82 having the same major functions as interface 60 of FIG. 3 but having additional modifications to the prior art to provide functions required for cooperation with address generator embodiments such as those shown in FIGS. 6 and 7. These additional modifications comprise means in the I/O Controller 71 for providing a segment length selecting signal on bus 70 to an address generator and means for inhibiting data transfer in the Storage Controls 68 when an Access Latch 76 is set to produce an access inhibiting signal on line 78. This may be done, for example, by the removal of an enabling voltage from appropriate AND gates in the Storage Controls 68 when the access inhibiting signal appears. The modifications further include means for setting the Access Latch 76 when a Selection Change Detector 74 detects a change in either the zone selecting signal on bus 62 or the track selecting signal on bus 72, or both of these, and means for resetting the Access Latch 76 on the next occurrence after such signal change of a DMP 54. These access inhibiting means may properly be considered a part of certain preferred address generator embodiments as further discussed below and are therefore shown set apart from interface 82 by dashed block 73. In addition, the DMP 54 and read/write clock signal 64 are coupled to the I/O Controller 71 for synchronizing the generation of the segment length selecting signal in the dynamic mode of operation as further discussed below.

Figure 5:
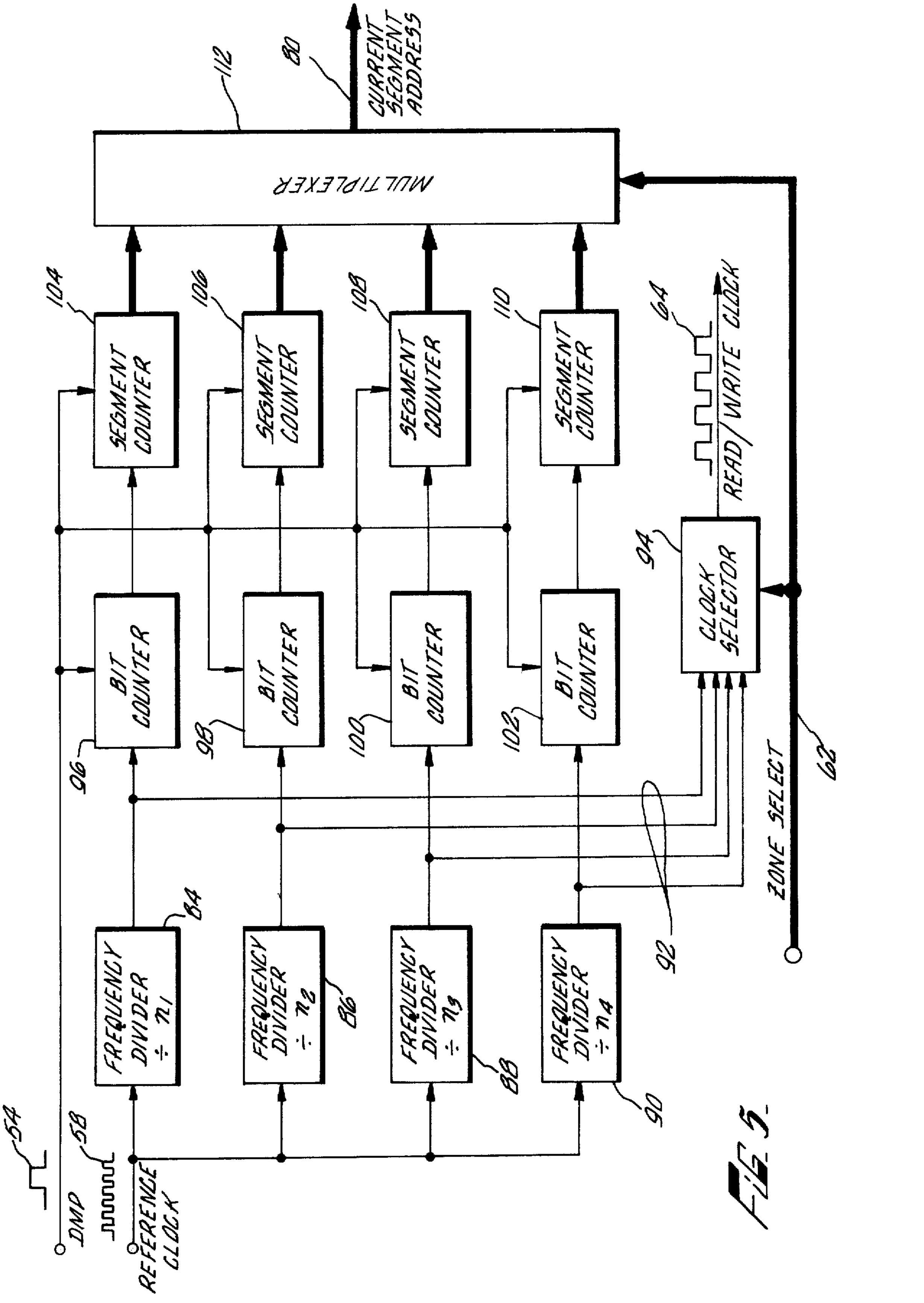
FIG. 5 is a schematic block diagram of one embodiment of the address generator of this invention.

In a first embodiment of an address generator according to this invention shown in FIG. 5, a plurality of frequency dividers are provided. All of them have the reference clock signal 58 as their input. The number of frequency dividers used here is selected to be equal to that number of distinct frequency zones for information storage provided on the memory store 10 (FIG. 1). The frequency dividers 84, 86, 88 and 90 each operate on the reference clock signal 58 with a different preselected divisor (division factor) to produce a read/write clock signal on each one of the lines of bus 92 at that zone frequency which corresponds to the frequency selected for writing and reading data in one frequency zone. That is, each of the several read/write clock signals is independently associted with a distinct one of the zones. The read/write clock signals exhibit frequency fluctuations proportional to fluctuations in disk rotation speed by reason of their derivation from the reference clock signal 58.

For a multi-zone system, the address generator of FIG. 5 obviates the need of the prior art for a plurality of prerecorded clock tracks. One read/write clock signal 64 is provided by the Clock Selector 94 to be used for controlling and synchronizing the transfer of information from and to the memory store 10 (FIG. 1). As a limit, as many frequency dividers may be provided as there are information tracks on the memory store to generate a read/write clock signal for each track. The Clock Selector 94, which may be a switcing matrix, responds to the zone selecting signal on bus 62 to transfer the selected read/write clock signal 64 from bus 92 to the Storage Controls 68 of interface 60 (FIG. 3).

The prior selection of the frequency of the disk clock signal 52, the multiplication factor $m$, of the frequency multiplier 56 and the division factors, $n_i$, of the several frequency dividers 84, 86, 88 and 90 is made jointly to produce the correct frequencies for the read/write clock signals. The selection process will be illustrated in the succeeding paragraph.

The address generator of FIG. 5 is suited for use with a disk 10 organized as illustrated in FIG. 1. Frequency dividers 84, 86, 88 and 90 produce four read/write clock signals for the zones 12, 14, 16 and 18, respectively, of the disk 10 of FIG. 1. In the organization of FIG. 1, all zones have an equal number of tracks and the innermost track of outermost zone 18 is at four times the radial distance from the center as the innermost track of zone 12. To produce this result, the ratios of the frequencies of the four read/write clock signals are 1:2:3:4 for zones 12, 14, 16 and 18, respectively. A practical choice for the frequency associated with outermost zone 18 is, for example, 10 MHz. This frequency is high enough to produce a satisfactorily high bit packing density on a disk of standard size yet not too high for state-of-the-art magnetic transducers. In selecting the frequency for the reference clock signal 58, consideration is given to the type of frequency dividing circuits to be used. Counter-dividers, which are restricted to frequency division by integers, are relatively inexpensive. By choosing the frequency of reference clock signal 58 at 30 MHz, the division factors $n_1$, $n_2$, $n_3$ and $n_4$ of frequency dividers 84, 86, 88 and 90, respectively, must be set at 12, six, four and three respectively. Thus, the frequencies of the read/write clock signals for zones 12, 14, 16 and 18 have been preselected at 2.5 MHz, 7.5 MHz and 10 MHz. In a final step of the selection process, the bit density in disk clock track 32A may be selected to produce a disk clock signal frequency of, for example, 5 MHz. This requires that the Frequency Multiplier 56 (FIG. 2) have a multiplication factor, $m$, of six.

Certain advantageous variations in the structure given above and illustrated in FIG. 5 will be apparent to those skilled in the art. Where, as in the exmaple given above, the frequency of the disk clock signal 52 (FIG. 2) corresponds to the required read/write clock signal of any one zone, provision can be made to use it as such and thereby reduce the number of frequency divider circuits required. In another variation, less costly frequency divider circuits with fewer stages may be used by connecting two or more of them in cascade to produce some of the read/write clock signals instead of requiring each frequency divider to operate independently on the reference clock signal 58.

In the embodiment of FIG. 5, each distinct zone read/write clock signal is coupled, as a first input signal, to a corresponding distinct digital counting circuit, i.e., a bit counter. Bit counters 96, 98, 100 and 102 are coupled to receive the read/write clock signals generated by frequency dividers 84, 86, 88 and 90, respectively. The modulo of each bit counter is fixed and selected to be equal to the number of bits in an information unit size which the interface 60 (FIG. 3) between the memory store 10 (FIG. 1) and the data processor is designed to transfer. All of the bit counters may have the same modulo, if that is appropriate, or each may have a different modulo to provide for the storage of different information unit sizes in different zones. Each bit counter produces a carry pulse output signal and is reset to zero count each time the number of read/write clock pulses counted reaches any integer multiple of the counter's modulo. Each bit counter has a second independent input circuit for receiving an initializing signal which resets the counter to zero regardless of its then existing state. The DMP 54 is coupled to this second input circuit of each bit counter causing it to be reset once per revolution of the memory store 10 (FIG. 1). It will be readily appreciated that each bit counter will output a carry pulse each time a sector in the zone associated with the input read/write clock signal is traversed.

Clearning the bit counters with the DMP 54 for each revolution of the disk is necessary because unusable fractions of segments may be present causing a partial count to remain in a bit counter at the end of a revolution.

The carry pulse outputs of bit counters 96, 98, 100 and 102 are separately coupled to segment counters 104, 106, 108 and 110, respectively. Thus, segment counters 104, 106, 108 and 110 are each separately associated with zones 12, 14, 16 and 18, respectively. The modulo of each segment counter is at least as great as the number of sectors to be accommodated in the corresponding zone on the memory store 10 (FIG. 1). As with the bit counters, each segment counter is provided with a second input circuit which receives the DMP 54 to reset it to zero once per revolution of the memory store 10 (FIG. 1). It follows from the above description that each segment counter will contain at all times after initialization a count which is a measure of the angular displacement of the read/write heads from the line of reference 34 on the memory store 10 (FIG. 1) established by the DMP 54. This count is therefore suitable for use as the current segment address for the corresponding zone. A Multiplexer 112 is coupled to transmit on line 80 the information from that segment counter which is designated by the coded zone selecting signal on bus 62. The information contained in the selected segment counter is made available for comparison in Address Comparator 69 with the designated segment address in the segment address field of Address Register 67 (FIG. 3). The current segment address thus accumulated and transmitted to the Address Comparator 69 is used in substantially the same manner as address track information is used in the prior art. The need for address tracks to be prerecorded on the memory store 10 (FIG. 1) is thereby eliminated.

In FIG. 3, the DMP 54 is shown coupled to Address 69. This enables Address Comparator 69 to prevent data transfer on start-up prior to the time that the bit counters and segment counters have been initialized by at least one occurrence of the DMP 54.

It will be apparent to those skilled in the art that various types of segment counters are available which may be used with this invention to accommodate a variety of segment address formats. For example, segment counters may be chosen too accumulate the current segment address in binary, binary coded decimal, or Gray code. It will also be apparent to those skilled in the art that still other variations from the embodiment depicted in FIG. 5 are possible. For example, counting circuits are availaable which can provide correct segment counts simultaneously for a plurality of zones where the ratios of the numbers of sectors in the separate zones are appropriately matched to a counter's structure. Fewer counters could then be used to perform the functions described above.

A second embodiment of this invention is shown in FIG. 6. The overall structure of this embodiment is the same as that of the embodiment of FIG. 5. Flexibility is provided by replacing the fixed modudlo bit counters 96, 98, 100 and 102 used in the embodiment of FIG. 5, described above, with variable modulo counters 114, 116, 118 and 120. Variable modulo counters, as is well known to those skilled in the art, are provided with additional circuitry adapted to receive one or more control voltages at specified levels to set the modulo of the counter at one of a plurality of predetermined values. The presence or absence of control voltages on the several lines of bus 70 form a single coded signal, i.e., the segment length selecting signal, which determines the modulo of a counter.

The segment length selecting signal may be derived from a source that is static. As an example, the coded segment length selecting signal may be developed by connecting, as appropriate, certain of the conductors of bus 70 to a constant voltage source, which may be an ordinary D.C. power supply, to maintain those conductors at a predetermined potential. The remaining conductors will ordinarily be connected to ground. Such a static source will maintain the coded signal constant, and thereby the bit counter modulo constant, until the system user intervenes to effect a change. For example, the signal may be derived from a source accessible to be altered manually by a switch to accommodate adaption of the storage unit to the fixed information unit size characteristics of a particular data processor or I/O controller. For another example, a segment length selecting signal source may be incorporated in I/O Controller 71 of the interface 82 of FIG. 4 to produce a fixed signal on bus 70, the signal being coded to set the modulo at the proper value. In both of these examples, different data processors and I/O controllers designed to transfer different fixed information unit sizes can be adapted to supply appropriately different fixed segment length selecting signals to the same storage unit without otherwise altering that unit.

FIG. 6 shows only one bus 70 for coupling the same segment length selecting signal to all of the variable modulo bit counters. However, a plurality of distinct segment length selecting signals may be generated for setting the modulo of each bit counter to a different value where different sizes of information units are to be allocated for storage in different zones.

When the segment length selecting signal is held static, the uniform sector geometry discussed above and depicted in FIG. 1 is preserved. The fact that the signal may be changed on rare occasions to expand or contract the angular extent of the sectors does not destory the uniformity.

However, it may readily be seen that there is no inherent limitation in the address generator of FIG. 6 that requires that the segment length selecting signal be held static. Given a data processing system with capabilities for manipulating units of information of varying sizes and I/O controls capable of transferring them, the variable modulo bit counters make it possible for such a system to transfer such varying size information units to and from a memory store by dynamically varying the segment length selecting signal. The I/O Controller 71 (FIG. 4) might, for example, vary the segment length selecting signal in such a way as to effect storage or retrieval, consecutively and without wasted storage space of a 180 word record, a single character and even a single bit in independently addressable locations on an information track. Necessarily, system software in the Data Processor or I/O Controller 71 would be required to maintain control over such dynamic variation in the size of an addressable location and to do a certain amount of record-keeping. For example, safeguards would be required to prevent an attempt to store more information in a track than can be accommodated.

Dynamic variation of the size of addressable locations will destroy the regular geometry of information storage depicted in FIG. 1. In the general case, no two successive segments on a track will have the same length or angular extent. Similarly, adjacent segments on adjacent tracks will not, in general, have the same angular extent. In this dynamic mode of operation, when a given track is addressed after once having been used to store information, addressing that same track again requires that the same sequence of bit counter modulo changes be made from the time of occurrence of a DMP 54 as was used to store the information originally. This is necessary to keep the state of a segment counter valid as an address. Since the sequence of modulo changes may be different for each track and different for the same track at different times, the I/O Controller 71 (FIG. 4) or Data Processor must maintain current tables of these sequences and apply them appropriately for successcul subsequent access to the same information locations. This is one of the required record-keeping functions mentioned above. The use of such tables must be synchronized to the rotation of the disk. The DMP 54 and read/write clock signal 64 are shown coupled to the I/O Controller 71 in FIG. 4 to facilitate the synchronizing process.

The above discussion of some provisions for varying segment length which might be made in I/O Controller 71 or the Data Processor are by way of example only. The details of such provisions are not part of this invention and, therefore, are not further discussed here.

In the dynamic variation mode of operation, it cannot be assumed that the sequence of time intervals for incrementing a segment counter will be the same for any two tracks. Where dynamic variation in the length of an addressable location on a disk is to be implemented, this invention comprises, in a third embodiment, the structure shown in FIG. 6 in combination with the access inhibiting features of block 73 shown cooperating with the interface 82 in FIG. 4. The Selection Change Detector 74 and Access Latch 76 serve to prevent data transfer from a point in time at which a change occurs in either the track selection field or the zone selection field of the composite address in Address Register 69 until a DMP 54 occurs. This delay in permitting access is required to allow time for segment counters 104, 106, 108 and 110 to be reset to zero. Assuming that interface 82 is otherwise properly controlled for dynamic variation, correspondence between the information contained in the segment counters and correct current segment addresses for the particular new track address is thereby insured.

The advantages of optimization of use of the storage space available on a memory store and flexibility in accommodating different sizes of addressable units of information as provided by an address generator having variable modudlo bit counters as in FIG. 6 need not be confined to multi-zone systems. These advantages may be made available for single zone systems by employing only one variable modulo bit counter to receive and count the pulses of a read/write clock signal and only one segment counter to receive and count the carry pulses output by the variable modulo bit counter. As before, the segment length selecting signal may be held static or varied dynamically by I/O Controller 71 of interface 82. Cooperation with the access inhibiting features of block 73 will be required for operation in the dynamic mode.

In multi-zone systems, there may be a cost advangtage in using a single variable division factor frequency divider to replace the plurality of frequency dividers having fixed division factors used in the embodiments of FIGS. 5 and 6. Where the division factors may be integers, a variable modulo counter-divider may be used.

Thus, as shown in FIG. 7, in another embodiment of this invention, a single variable modulo counter-divider 122 is coupled to receive the reference clock signal 58 and to transmit its output signal to a single bit counter 124. The number of different division factors which counter-divider 122 may be set to have is at least as large as the number of zones to be provided on a disk. The division factor at any instant is the modulo of the counter-divider as determined by the coded zone selecting signal on bus 62. The read/write clock signal 64 output by counter-divider 122 is also provided to the Storage Controls 68 on line 64.

The bit counter 124 is a variable modulo bit counter having its modulo determined by the coded segment length selecting signal on bus 70. As discussed above in connection with the address generator embodiment of FIG. 6, the segment length selecting signal may be held static or varied dynamically by I/O Controller 71 (FIG. 4). Where the segment length selecting signal is varied dynamically, the address generators of FIGS. 6 and 7 function in substantially the same mannr in that both of them require the cooperation of the Selection Change Detector 74 and Access Latch 76 in block 73 for the reasons already discussed.

Where the segment length selecting signal is held static, the address generator of FIG. 6 functions correctly when the zone selecting signal is changed without the need for implementing any delay in access to the memory store. That is because, in static mode operation, each of the several segment counters, once initialized, always contain a correct current segment address for the associated zone. However, the address generator of FIG. 7 must always be employed with the access inhibiting elements of block 73 (FIG. 4), even though interface 82 is operated in the static mode, since only one segment counter is provided here. Segment counter 126 must always be reset to zero by a DMP 54 after a zone selection change to insure correspondence between the information contained in the segment counter 126 and the correct current segment address for the new zone selected.

Another useful embodiment of this invention may be implemented by using a single variable division factor frequency divider in combination with a single fixed modulo bit counter. This embodiment would resemble that shown in FIG. 7, but having the variable modulo bit counter 124 replaced with a fixed modulo bit counter. Such an address generator would function in substantially the same manner as the fixed segment length address generator of FIG. 5. However, it will be readily apparent that any such address generator having only one segment counter for a multi-zone system will be required to operate in combination with the access inhibiting elements of block 73 (FIG. 4).

All aspects of this invention may be reduced to practice using techniques for assembling electronic systems which are well known to those skilled in the art. The ease of such assembly is due, in part, to the availability of integrated circuits. Such circuits combine many electricial and electronic elements in a single compact package capable of performing one or more specified functions. Furthermore, the manufacturers of such integrated circuits have provided complete product lines of these functional packages which are electrically compatible with each other. That is, the packages may be readily interconnected to form a desired electronic system.

In the following examples, page nubmer references are to the catalog "Integrated Circuits", Signetics Corporation, Sunnyvale, Calif., 1972.

The frequency multiplier 56 of FIG. 1 may be assembled from Signetics Part No. 562, Phase Locked Loop, p. 6–66 et seq., and Signetics Part No. N74163, Synchronous 4-Bit Counter, p. 2–138 et seq. The counter is connected to serve as a frequency divider in a feedback path of the phase locked loop A Synchronous 4-Bit Counter, Signetics Part No. N74163, p. 2–138 et seq., may also be used, singly or interconnected in groups, to implement the following functional elements of this invention:

| Functional Element(s) | Figure Number |
|---|---|
| Frequency Dividers 84, 86, 88 and 90 | FIGS. 5 and 6 |
| Bit Counters 96, 98, 100 and 102 | FIG. 5 |
| Variable Modulo Bit Counters 114, 116, 118 and 120 | FIG. 6 |
| Segment Counters 104, 106, 108 and 110 | FIGS. 5 and 6 |
| Variable Modulo Counter-Divider 122 | FIG. 7 |
| Variable Modulo Bit Counter 124 | FIG. 7 |
| Segment Counter 126 | FIG. 7 |

The Clock Selector 94 and the Multiplexer 112, both of which are shown in FIGS. 5 and 6, may each be implemented using one or more of Signetics Part No. 8230, 8-Input Digital Multiplexer, p. 3–22 et seq.

The functions of the Selection Change Detector 74 of FIG. 4 may be implemented by interconnecting Signetics Part No. N74163, Synchronous 4-Bit Counter, p. 2–138 et seq., and Signetics Part No. N7485, 4-Bit Magnitude Comparator, p. 2–85 et seq. In this example, the counter is used as a register which is updated to store the state of the zone selecting signal on bus 62 once for each cycle of the read/write clock signal 64. The register and the bus 62 are both coupled to provide inputs to the comparator. During any interval between a time when the state of the zone selecting signal on bus 62 is changed and the state of the register is subsequently updated in accordance with that change, the comparator generates an output indicating that the change has occurred. Where the Selection Change Detector 74 of FIG. 4 is also required to indicate a change in the track selecting signal on bus 72, an additional Signetics Part No. N74163 and an additional Signetics Part No. N7485 may be coupled in the same manner as described immediately above to produce a similar result. As stated above, this example contemplates the use of the read/write clock signal 64. However, that signal was not shown coupled to the Selection Change Detector 74 in FIG. 4 since other equally satisfactory methods for implementing the same function, but not requiring a clock signal, are well known to those skilled in the art.

The Access Latch 76 of FIG. 4 may be implemented using a flip-flop coupled to receive the output of a comparator in the Selection Change Detector 74 of FIG. 4. Signetics Part No. N7470, J-K Flip-Flop, p. 2–66 et seq., may be used for this purpose.

While the invention has been shown and described with reference to certain preferred embodiments thereof, it will be understood by those skilled in the art that various changes in details may be made therein without departing from the spirit and scope of the invention as set out in the following claims.

What is claimed is:

1. In a data storage system adapted to organize the storage of data into individually addressable segments of tracks on a rotating memory store, the tracks being grouped into a plurality of zones wherein each zone is characterized by a distinct predetermined zone frequency for recording and retrieving data, the zone frequency characterizing each one of said zones being a frequency different from any other zone frequency, said system including means for generating a coded zone selecting signal to select a particular zone for access; an address generator for providing a current segment address which comprises:

means directly assoicated with the memory store for generating a memory store clock signal having a predetermined frequency responsive to the speed of rotation of the memory store wherein the frequency of said memory store clock signal may be higher than all of said zone frequencies, lower than all of said zone frequencies, intermediate any two of said zone frequencies, or substantially equal to any one of said zone frequencies, as desired;

circuit means for deriving a plurality of read/write clock signals from said memory store clock signal, each one of said read/write clock signals comprising a pulse train having a distinct frequency substantially equal to a different one of said zone frequencies whereby each of said read/write clock signals is independently associated with a distinct one of said zones for synchronizing the recording of data in and retrieving of data from segments in the assoicated zone first counting circuit means for counting the pulses of a read/write clock signal, said first counting circuit means having a modulo equal to the number of bits storable in a segment and generating an output pulse each time the number of read/write clock signal pulses counted therein reaches said modulo;

second counting circuit means for accumulating a current segment address therein by counting the output pulses of said first counting circuit means, and means generating a mark pulse each time the memory store completes a revolution for resetting said first and second counting circuit means in response to each occurrence of said mark pulse.

2. An address generator as recited in claim 1 wherein said circuit means for deriving a plurality of read/write clock signals comprises means for generating all of said read/write clock signals simultaneously.

3. An address generator as recited in claim 2 wherein said first counting circuit means comprises a plurality of individual bit counting circuits, each of said bit counting circuits having a distinct one of said read/write clock signals coupled as an input thereto.

4. An address generator as recited in claim 3 wherein said second counting circuit means comprises a plurality of individual segment counting circuits, each of said segment counting circuits having the output pulses of a bit counting circuit coupled as an input thereto for causing each of said segment counting circuits to accumulate a current segment address therein applicable to a distinct one of said zones.

5. An address generator as recited in claim 2 which comprises means for selecting a particular one of the simultaneously generated plurality of read/write clock signals for use in synchronizing the recording and retrieving of data, said selecting means having the zone selecting signal coupled thereto for effecting the selection of that read/write clock signal having its frequency substantially equal to the zone frequency characterizing the selected zone.

6. An address generator as recited in claim 5 wherein said first counting circuit means comprises a bit counting circuit coupled to receive said selected read/write clock signal; and wherein said second counting circuit means comprises a segment counting circuit coupled to receive the output pulses of said bit counting circuit.

7. An address generator as recited in claim 5 which comprises means for inhibiting access to the memory store upon the occurrence of a change in said zone selecting signal until a mark pulse is generated.

8. An address generator as recited in claim 1 wherein said circuit means for deriving a plurality of read/write clock signals comprises:

a frequency multiplying circuit having a predetermined multiplication factor, said frequency multiplying circuit operating on said memory store clock signal to produce a reference clock signal wherein the frequency of the reference clock signal may be any frequency higher than that of the memory store clock signal, as desired; and a frequency divider circuit having a division factor capable of being varied for operating on said reference clock signal to produce a selected one of said plurality of read/write clock signals, said frequency divider circuit having the zone selecting signal coupled thereto for determining said division factor.

9. An address generator as recited in claim 8 wherein said first counting circuit means comprises a bit counting circuit coupled to receive said selected read/write clock signal; and wherein said second counting circuit means comprises a segment counting circuit coupled to receive the output pulses of said bit counting circuit.

10. An address generator as recited in claim 8 which comprises means for inhibiting access to the memory store upon the occurrence of a change in said zone selecting signal until a mark pulse is generated.

11. In a data storage system adapted to store data in tracks on a rotating memory store, the tracks being grouped into a plurality of zones wherein each zone is characterized by a distinct predetermined zone frequency for recording and retrieving data, the zone frequency characterizing each one of said zones being a frequency different from any other zone frequency; the combination for generating read/write clock signals for synchronizing said recording and retrieving of data which comprises:

means directly associated with the memory store for generating a memory store clock signal having a predetermined frequency responsive to the speed of rotation of the memory store wherein the frequency of said memory store clock signal may be higher than all of said zone frequencies, lower than all of said zone frequencies, intermediate any two of said zones frequencies, or substantially equal to any one of said zone frequencies, as desired; and circuit means for deriving a plurality of read/write clock signals from said memory store clock signal, each one of said read/write clock signals comprising a pulse train having a distinct frequency substantially equal to a different one of said zone frequencies whereby each of said read/write clock signals is independently associated with a distinct one of said zones for synchronizing the recording of data in and retrieving of data from segments in the associated zone.

12. The combination as recited in claim 11 wherein said circuit means comprises at least one frequency divider circuit having said memory store clock signal as an input and a read/write clock signal as an output, said frequency divider circuit having a division factor selected to cause the frequency of the read/write clock signal output thereby to be substantially equal to one of said zone frequencies.

13. The combination as recited in claim 11 wherein said circuit means comprises a frequency multiplying circuit having a predetermined multiplication factor, said frequency multiplying circuit operating on said memory store clock signal to produce a reference clock signal wherein the frequency of the reference clock signal may be any frequency higher than that of the memory store clock signal, as desired.

14. The combination as recited in claim 13 wherein said predetermined multiplication factor is selected to cause the frequency of the reference clock signal to be substantially equal to one of said zone frequencies.

15. The combination as recited in claim 13 wherein said circuit means comprises at least one frequency divider circuit having said reference clock signal as an input and a read/write clock signal as an input, said frequency divider circuit having a division factor selected to cause the frequency of the read/write clock signal output thereby to be substantially equal to one of said zone frequencies.

16. The combination as recited in claim 15 wherein said predetermined division factor is an integer.

17. In a data storage system adapted to store data in tracks on a rotating memory store, the tracks being grouped into a plurality of zones wherein each zone is characterized by a distinct predetermined zone frequency for recording and retrieving data, the zone frequency characterizing each one of said zones being a frequency different from any other zone frequency, said system including means for generating a coded zone selected signal to select a particular zone for access; the combination for generating read/write clock signals for synchronizing said recording and retrieving of data which comprises:

means for generating a first clock signal having a predetermined frequency responsive to the speed of rotation of the memory store wherein the frequency of said first clock signal may be higher than all of said zone frequencies, intermediate any two of said zone frequencies; or substantially equal to one of said zone frequencies, as desired; and a frequency divider circuit having a division factor capable of being varied for operating on said first clock signal to produce a read/write clock signal having a frequency substantially equal to one of said zone frequencies, said frequency divider circuit having the zone selecting signal coupled thereto for determining said division factor.

18. In a data storage system adapted to organize the storage of data into individually addressable segments of tracks on a rotating memory store, the tracks being grouped into a plurality of zones wherein each zone is characterized by a distinct predetermined zone frequency for recording and retrieving data, the zone frequency characterizing each one of said zones being a frequency different from any other zone frequency, said system including means for generating a coded zone selecting signal to select a particular zone for access and further including means for generating at least one coded segment length selecting signal to select the number of bits to be stored in a segment; an address generator for providing a current segment address which comprises:

means for generating a plurality of read/write clock signals, each one of said read/write clock signals comprising a pulse train having a distinct frequency substantially equal to a different one of said zone frequencies and responsive to the speed of rotation of the memory store whereby each of said read/write clock signals is independently associated with a distinct one of said zones for synchronizing the recording of data in and retrieving of data from segments in the associated zone;

first counting circuit means for counting the pulses of a read/write clock signal, said first counting circuit means having a variable modulo and generating an output pulse each time the number of read/write clock signal pulses counted therein reaches said modulo, said first counting means further having a segment length selecting signal coupled thereto to set said modulo equal to the number of bits storable in a segment;

second counting circuit means for accumulating a current segment address therein by counting the output pulses of said first counting circuit means; and means generating a mark pulse each time the memory store completes a revolution for resetting said first and second counting circuit means in response to each occurrence of said mark pulse.

19. An address generator as recited in claim 18 wherein said means for generating a plurality of read/write clock signals comprises means for generating all of said read/write clock signals simultaneously.

20. An address generator as recited in claim 19 wherein said first counting circuit means comprises a plurality of individual variable modulo bit counting circuits, each of said variable modulo bit counting circuits having a distinct one of said read/write clock signals coupled as a first input thereto and each having a segment length selecting signal coupled as a second input thereto.

21. An address generator as recited in claim 20 wherein said second counting circuit means comprises a plurality of individual segment counting circuits, each of said segment counting circuits having the output pulses of a bit counting circuit coupled as an input thereto for causing each of said segment counting circuits to accumulate a current segment address therein applicable to a distinct one of said zones.

22. An address generator as recited in claim 19 which comprises means for selecting a particular one of the simultaneously generated plurality of read/write clock signals for use in synchronizing the recording and retrieving of data, said selecting means having the zone selecting signal coupled thereto for effecting the selection of that read/write clock signal having its frequency substantially equal to the zone frequency characterizing the selected zone.

23. An address generator as recited in claim 22 wherein said first counting circuit means comprises a variable modulo bit counting circuit coupled to receive said selected read/write clock signal as a first input thereto and coupled to receive a segment length selecting signal as a second input thereto; and wherein said second counting circuit means comprises a segment counting circuit coupled to receive the output pulses of said variable modulo bit counting circuit.

24. An address generator as recited in claim 18 which comprises means for inhibiting access to the memory store upon the occurrence of a change in said zone selecting signal until said mark pulse is generated.

25. An address generator as recited in claim 18 wherein said means for generating a plurality of read/write clock signals comprises:

a frequency multiplying circuit having a predetermined multiplication factor, said frequency multiplying circuit operating on a memory store clock signal to produce a reference clock signal wherein the frequency of the memory store clock signal may be higher than all of said zone frequencies, lower than all of said zone frequencies, intermediate any two of said zone frequencies, or substantially equal to any one of said zone frequencies, as desired, and wherein the frequency of the reference clock signal may be any frequency higher than that of the memory store clock signal, as desired, and a frequency divider circuit having a division factor capable of being varied for operating on said reference clock signal to produce a selected one of said plurality of read/write clock signals, said frequency divider circuit having the zone selecting signal coupled thereto for determining said division factor.

26. An address generator as recited in claim 25 wherein said first counting circuit means comprises a variable modulo bit counting circuit coupled to receive said selected read/write clock signal as a first input thereto and coupled to receive a segment length selecting signal as a second input thereto; and wherein said second counting circuit means comprises a segment counting circuit coupled to receive the output pulses of said variable modulo bit counting circuit.

27. In a data storage system adapted to organize the storage of data into individually addressable segments of varying length on tracks on a rotating memory store, the tracks being grouped into a plurality of zones wherein each zone is characterized by a distinct predetermined zone frequency for recording and retrieving data, the zone frequency characterizing each one of said zones being a frequency different from any other zone frequency, said system including: means for generating a coded zone selecting signal to select a particular zone for access; means for generating at least one coded segment length selecting signal to select the number of bits to be stored in a segment; and means for generating a track selecting signal to select a particular track for access; an address generator for providing a current segment address which comprises:

means for generating a plurality of read/write clock signals, each one of said read/write clock signals comprising a pulse train having a distinct frequency substantially equal to a different one of said zone frequencies and responsive to the speed of rotation of the memory store whereby each of said read/write clock signals is independently associated with a distinct one of said zones for synchronizing the recording of data in and retrieving of data from segments in the associated zone;

first counting circuit means for counting the pulses of a read/write clock signal, said first counting circuit means having a variable modulo and generating an output pulse each time the number of read/write clock signal pulses counted therein reaches said modulo, said first counting means further having a segment length selecting signal coupled thereto to set said modulo equal to the number of bits storable in a segment;

second counting circuit means for accumulating a current segment address therein by counting the output pulses of said first counting circuit means;

means generating a mark pulse each time the memory store completes a revolution for resetting said first and second counting circuit means in response to each occurrence of said mark pulse;

means for inhibiting access to the memory store upon the occurrence of a change in said zone selecting signal until said mark pulse is generated; and means for inhibiting access to the memory store upon the occurrence of a change in said track selecting signal until said mark pulse is generated.

28. An address generator as recited in claim 27 wherein said means for generating a plurality of read/write clock signals comprises means for generating all of said read/write clock signals simultaneously.

29. An address generator as recited in claim 28 wherein said first counting circuit means comprises a plurality of individual variable modulo bit counting circuits, each of said variable modulo bit counting circuits having a distinct one of said read/write clock signals coupled as a first input thereto and each having a segment length selecting signal coupled as a second input thereto.

30. An address generator as recited in claim 29 wherein said second counting circuit means comprises a plurality of individual segment counting circuits, each of said segment counting circuits having the output pulses of a bit counting circuit coupled as an input thereto for causing each of said segment counting circuits to accumulate a current segment address therein applicable to a distinct one of said zones.

31. An address generator as recited in claim 28 which comprises means for selecting a particular one of the simultaneously generated plurality of read/write clock signals for use in synchronizing the recording and retrieving of data, said selecting means having the zone selecting signal coupled thereto for effecting the selection of that read/write clock signal having its frequency substantially equal to the zone frequency characterizing the selected zone.

32. An address generator as recited in claim 31 wherein said first counting circuit means comprises a variable modulo bit counting circuit coupled to receive said selected read/write clock signal as a first input thereto and coupled to receive a segment length selecting signal as a second input thereto; and wherein said second counting circuit means comprises a segment counting circuit coupled to receive the output pulses of said variable modulo bit counting circuit.

33. An address generator as recited in claim 27 wherein said means for generating a plurality of read/write clock signals comprises:

a frequency multiplying circuit having a predetermined multiplication factor, said frequency multiplying circuit operating on a memory store clock signal to produce a reference clock signal wherein the frequency of the memory store clock signal may be higher than all of said zone frequencies, lower than all of said zone frequencies, intermediate any two of said zone frequencies, or substantially equal to any one of said zone frequencies, as desired, and wherein the frequency of the reference clock signal may be any frequency higher than that of the memory store clock signal, as desired; and a frequency divider circuit having a division factor capable of being varied for operating on said reference clock signal to produce a selected one of said plurality of read/write clock signals, said frequency divider circuit having the zone selecting signal coupled thereto for determining said division factor.

34. An address generator as recited in claim 33 wherein said first counting circuit means comprises a variable modulo bit counting circuit coupled to receive said selected read/write clock signal as a first input thereto and coupled to receive a segment length selecting signal as a second input thereto; and wherein said second counting circuit means comprises a segment counting circuit coupled to receive the output pulses of said variable modulo bit counting circuit.

35. In a data storage system adapted to organize the storage of data into individually addressable segments of tracks on a rotating memory store, said system comprising means for generating a coded segment length selecting signal to select the number of bits to be stored in a segment; an address generator which comprises:

means for generating a read/write clock signal comprising a pulse train having a predetermined frequency responsive to the speed of rotation of the memory store for synchronizing the transfer of information to and from said segments;

a variable modulo bit counting circuit coupled to count the pulses of said read/write clock signal and generating an output pulse each time the number of read/write clock signal pulses counted therein reaches said modulo, said variable modulo bit counting circuit further having the segment length selecting signal coupled thereto to set said modulo equal to the number of bits storable in a segment;

a segment counting circuit for accumulating a current segment address therein coupled to count the output pulses of said bit counting circuit; and means generating a mark pulse each time the memory store completes a revolution for resetting said bit counting circuit and said segment counting circuit in response to each occurrence of said mark pulse.

36. In a data storage system adapted to organize the storage of data into individually addressable segments of varying length on tracks on a rotating memory store, said system comprising means for generating a coded segment length selecting signal to select the number of bits to be stored in a segment and means for generating a track selecting signal to select a particular track for access; an address generator which comprises:

means for generating a read/write clock signal comprising a pulse train having a predetermined frequency responsive to the speed of rotation of the memory store for synchronizing the transfer of information to and from said segments;

a variable modulo bit counting circuit coupled to count the pulses of said read/write clock signal and generating an output pulse each time the number of read/write clock signal pulses conted therein reaches said modulo, said variable modulo bit counting circuit further having the segment length selecting signal coupled thereto to set said modulo equal to the number of bits storable in a segment;

a segment counting circuit for accumulating a current segment address therein coupled to count the output pulses of said bit counting circuit;

means generating a mark pulse each time the memory store completes a revolution for resetting said bit counting circuit and said segment counting circuit in response to each occurrence of said mark pulse; and means for inhibiting access to the memory store upon the occurrence of a change in said track selecting signal until said mark pulse is generated.

* * * * *

UNITED STATES PATENT OFFICE
CERTIFICATE OF CORRECTION

PATENT NO. : 3,883,853
DATED : May 13, 1975
INVENTOR(S) : Harry C. O'Brien, et al.

It is certified that error appears in the above-identified patent and that said Letters Patent are hereby corrected as shown below:

Col. 2, line 47, between "the" and "clock", insert --disk--.
after "DMP" insert --signal--.
Col. 4, line 12, change "selected" to --selection--.
Col. 5, line 9, change "inventin" to --invention--.
line 11, change "sued" to --used--.
line 42, "FIG. 3" should be new paragraph.
Col. 6, line 6, change "althoug" to --although--.
Col. 7, line 61, change "associted" to --associated--.
Col. 8, line 8, change "switcing" to --switching--.
line 45, between "2.5 MHz" and "7.5 MHz", insert --5 MHz--.
line 53, change "exmaple" to --example--.
Col. 9, line 23, change "Clearning" to --Clearing--.
Col. 10, line 2, change "too" to --to--.
line 7, change "availaable" to --available--.
line 16, change "modudlo" to --modulo--.
line 41, change "adaption" to --adaptation--.
line 65, change "tory" to --troy--.
Col. 11, line 39, change "successcul" to --successful--.
Col. 12, line 9, change "modudlo" to --modulo--.
line 21, change "advangt-" to --advant---.
line 47, change "mannr" to --manner--.
Col. 13, line 27, change "nubmer" to --number--.
line 35, insert "." at end of line.
Col. 14, line 41, change "assoicated" to --associated--.
line 59, change "assoicated" to --associated--.
insert ";" at end of line.
Col. 15, line 1, change "," to --;--.

UNITED STATES PATENT OFFICE

CERTIFICATE OF CORRECTION

PATENT NO. : 3,883,853

Page 2

DATED : May 13, 1975

INVENTOR(S) : Harry C. O'Brien, et al.

It is certified that error appears in the above-identified patent and that said Letters Patent are hereby corrected as shown below:

(Continued)

Col. 16, line 55, change "input", second occurrence, to --output--.
Col. 17, line 3, change "selected" to --selecting--.
Col. 18, line 54, change "," to --;--.
Col. 22, line 6, change "conted" to --counted--.

Signed and Sealed this

*ninth* Day of *December 1975*

[SEAL]

*Attest:*

RUTH C. MASON
*Attesting Officer*

C. MARSHALL DANN
*Commissioner of Patents and Trademarks*